United States Patent
Saguchi

(10) Patent No.: US 12,183,894 B2
(45) Date of Patent: Dec. 31, 2024

(54) ELECTRODE FOR ALKALINE SECONDARY BATTERY AND ALKALINE SECONDARY BATTERY

(71) Applicant: FDK CORPORATION, Tokyo (JP)

(72) Inventor: Akira Saguchi, Tokyo (JP)

(73) Assignee: FDK CORPORATION, Tokyo (JP)

( * ) Notice: Subject to any disclaimer, the term of this patent is extended or adjusted under 35 U.S.C. 154(b) by 67 days.

(21) Appl. No.: 17/653,282

(22) Filed: Mar. 2, 2022

(65) Prior Publication Data

US 2022/0294025 A1 Sep. 15, 2022

(30) Foreign Application Priority Data

Mar. 10, 2021 (JP) .................. 2021-038460

(51) Int. Cl.
  *H01M 10/28* (2006.01)
  *H01M 4/02* (2006.01)
  *H01M 4/24* (2006.01)

(52) U.S. Cl.
  CPC ......... *H01M 10/286* (2013.01); *H01M 4/242* (2013.01); *H01M 2004/027* (2013.01); *H01M 2004/028* (2013.01)

(58) Field of Classification Search
  CPC .............. H01M 10/286; H01M 4/242; H01M 2004/027; H01M 4/383
  See application file for complete search history.

(56) References Cited

U.S. PATENT DOCUMENTS

2012/0315524 A1* 12/2012 Kihara ................ H01M 10/286
  429/94

FOREIGN PATENT DOCUMENTS

| JP | 2012256522 A | 12/2012 |
| JP | 2019016423 A | 1/2019 |
| WO | WO-2017090219 A1 * | 6/2017 |
| WO | WO-2018173345 A1 * | 9/2018 |

OTHER PUBLICATIONS

Hong, Kuochih. "The development of hydrogen storage electrode alloys for nickel hydride batteries." Journal of Power Sources 96.1 (2001): 85-89. (Year: 2001).*

(Continued)

*Primary Examiner* — Sadie White
*Assistant Examiner* — Kayla Elaine Clary
(74) *Attorney, Agent, or Firm* — Kinney & Lange, P.A.

(57) ABSTRACT

An electrode has a band-shaped core and an electrode mixture layer carried by the core to form a spiral electrode assembly with a gas generating electrode and a separator for an alkaline secondary battery. The electrode in the spiral shape has a first circumference portion, an intermediate portion, and an outermost circumference portion. The first circumference portion is a starting portion for winding into the spiral shape. The intermediate portion is a second and following circumferences of the spiral shape. The outermost circumference portion has an inner surface only which faces the gas generating electrode. The electrode mixture layer includes a reactant that develops a reaction consuming gas generated from the gas generating electrode. An amount of the reactant in the first circumference portion is more than those in the intermediate portion and/or the outermost circumference portion.

3 Claims, 4 Drawing Sheets

(56) References Cited

OTHER PUBLICATIONS

Cao, Zhijie, et al. "Enhanced discharge capacity and cycling properties in high-samarium, praseodymium/neodymium-free, and low-cobalt A2B7 electrode materials for nickel-metal hydride battery." International Journal of Hydrogen Energy 40.1 (2015): 451-455. (Year: 2015).*
Extended European Search Report dated Oct. 5, 2022, for corresponding European Application No. 22160802.9.

* cited by examiner

FIG. 4

| | NEGATIVE ELECTRODE MIXTURE AMOUNT (g/cm²) | | | AMOUNT OF HYDROGEN ABSORBING ALLOY (g/cm²) | | | RATIO OF AMOUNT OF ALLOY (%) (INTERMEDIATE PORTION IS SET AT 100%) | | | BATTERY INTERNAL PRESSURE (MPa) | YIELD | |
|---|---|---|---|---|---|---|---|---|---|---|---|---|
| | FIRST CIRCUMFERENCE PORTION | INTERMEDIATE PORTION | OUTERMOST CIRCUMFERENCE PORTION | FIRST CIRCUMFERENCE PORTION | INTERMEDIATE PORTION | OUTERMOST CIRCUMFERENCE PORTION | FIRST CIRCUMFERENCE PORTION | INTERMEDIATE PORTION | OUTERMOST CIRCUMFERENCE PORTION | | NUMBER OF ASSEMBLIES | NUMBER OF DEFECTS |
| COMPARATIVE EXAMPLE 1 (BATTERY D) | 0.175 | 0.175 | 0.105 | 0.172 | 0.172 | 0.103 | 100% | 100% | 60% | 0.99 | 30 | 0 |
| EXAMPLE 1 (BATTERY A) | 0.180 | 0.174 | 0.105 | 0.177 | 0.171 | 0.103 | 103% | 100% | 60% | 0.69 | 30 | 0 |
| EXAMPLE 2 (BATTERY B) | 0.193 | 0.173 | 0.105 | 0.189 | 0.170 | 0.103 | 112% | 100% | 61% | 0.58 | 30 | 0 |
| EXAMPLE 3 (BATTERY C) | 0.220 | 0.169 | 0.105 | 0.216 | 0.166 | 0.103 | 130% | 100% | 62% | 0.50 | 30 | 0 |
| COMPARATIVE EXAMPLE 2 (BATTERY E) | 0.230 | 0.168 | 0.105 | 0.226 | 0.165 | 0.103 | 137% | 100% | 63% | 0.48 | 30 | 3 |

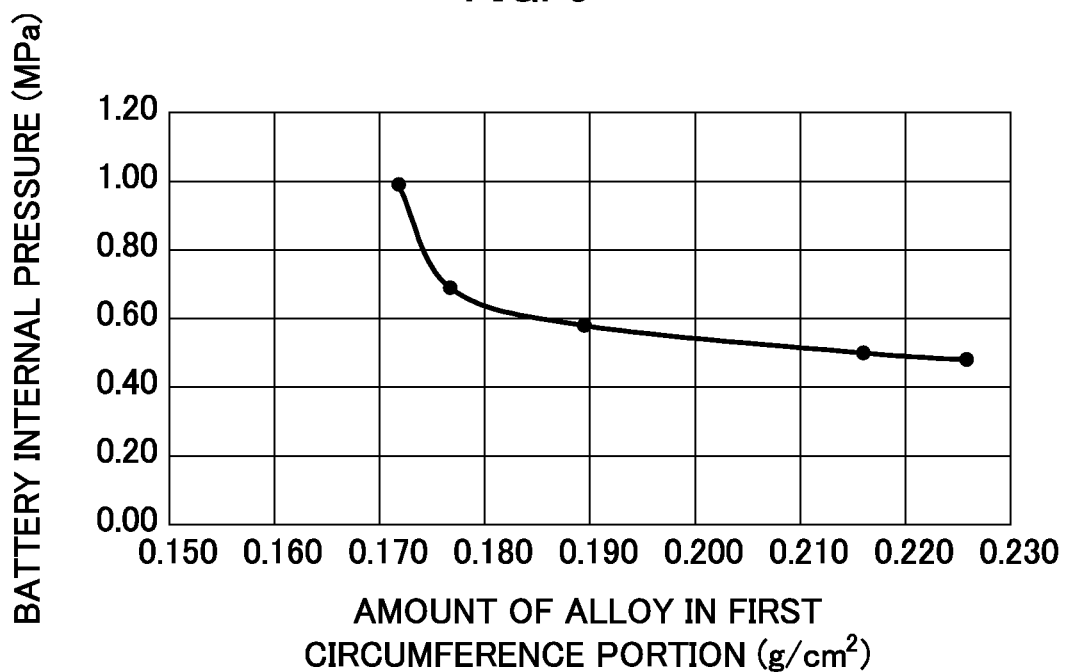

ELECTRODE FOR ALKALINE SECONDARY BATTERY AND ALKALINE SECONDARY
BATTERY

CROSS-REFERENCE TO RELATED APPLICATION(S)

This application claims priority to Japanese Application No. 2021-038460 filed on Mar. 10, 2021, which is incorporated by reference herein in its entirety.

BACKGROUND

Technical Field

The present disclosure relates to an electrode for alkaline secondary battery and an alkaline secondary battery using the electrode.

Description of the Related Art

As one type of alkaline secondary battery, there is known a nickel metal hydride secondary battery. A nickel metal hydride secondary battery has a high capacity, and is also excellent in environmental safety, as compared with a nickel cadmium secondary battery. Therefore, nickel metal hydride secondary batteries are used for various purposes such as various portable devices and hybrid electric automobiles. While various uses have been found for nickel metal hydride secondary batteries, cost reduction is desired.

As shown in Japanese Patent Laid-Open No. 2012-256522, for example, it is proposed to reduce the cost of a nickel metal hydride secondary battery while maintaining battery performance by thinning a mixture layer at a winding start portion and a winding end portion that do not face a positive electrode, of a negative electrode including a hydrogen absorbing alloy.

However, in the nickel metal hydride secondary battery in which the mixture layer at the winding start portion that does not face the positive electrode, of the negative electrode, is thinned, battery internal pressure tends to be high.

In light of the above described problem, an object of the present disclosure is to provide an electrode for alkaline secondary battery and an alkaline secondary battery that contribute to suppression of rise in battery internal pressure.

SUMMARY

According to one aspect of the present disclosure, an electrode for an alkaline secondary battery, the electrode being included in an electrode assembly accommodated in a container of the alkaline secondary battery, has a band-shaped core, and an electrode mixture layer carried by the core. The electrode faces a gas generating electrode with a separator being sandwiched therebetween. The gas generating electrode generates gas during an ending period in which the alkaline secondary battery is charged. The electrode and the gas generating electrode are wound with the separator to form a spiral shape. The electrode has a first circumference portion, an intermediate portion, and an outermost circumference portion. The first circumference portion corresponds to a starting portion for winding into the spiral shape and having an outer surface only which faces the gas generating electrode. The intermediate portion corresponds to a second and following circumferences of the spiral shape. The intermediate portion includes an inner surface and another outer surface both of which face the gas generating electrode. And the outermost circumference portion of the spiral shape has another inner surface only which faces the gas generating electrode. The electrode mixture layer includes a reactant that develops a reaction consuming the gas generated at the ending period. The first circumference portion includes an amount of the reactant which is more than an amount of the reactant in the intermediate portion and/or an amount of the reactant in the outermost circumference portion.

BRIEF DESCRIPTION OF THE DRAWINGS

The present disclosure will become more fully understood from the detailed description given hereinafter and the accompanying drawings which are given by way of illustration only, and thus, are not limitative of the present disclosure, and wherein:

FIG. 4 is a table showing a relationship of an amount of a hydrogen absorbing alloy that is applied onto a first circumference portion of the negative electrode, and battery internal pressure; and FIG. 5 is a graph showing the relationship of the amount of the hydrogen absorbing alloy that is applied to the first circumference portion of the negative electrode and the battery internal pressure.

DETAILED DESCRIPTION

Next, a nickel metal hydride secondary battery (hereinafter, simply referred to as a battery) including an electrode according to an embodiment will be described in detail. The battery to which the present disclosure is applied is not particularly limited, but is an AA size cylindrical battery 2 shown in FIG. 1, for example.

Figure 1:
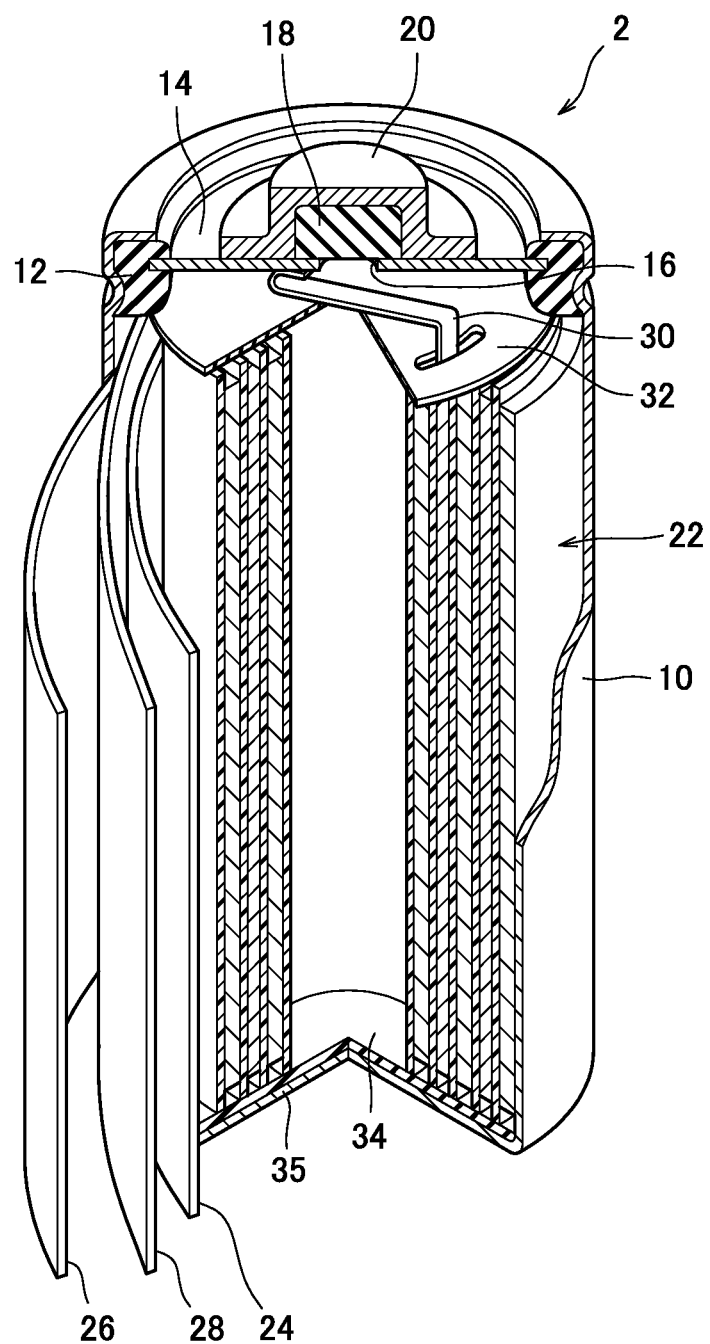
FIG. 1 is a perspective view showing an alkaline secondary battery according to an embodiment by partially breaking the alkaline secondary battery.

As shown in FIG. 1, the battery 2 includes an exterior can 10 forming a bottomed cylindrical shape with an upper end opened. A bottom wall 35 of the exterior can 10 has conductivity, and functions as a negative electrode terminal. In an opening of the exterior can 10, a cover plate 14 in a disk shape having conductivity and a ring-shaped insulation packing 12 surrounding the cover plate 14 are disposed, and the insulation packing 12 is fixed to an opening edge of the exterior can 10 by crimping the opening edge of the exterior can 10. In other words, the cover plate 14 and the insulation packing 12 cooperate with each other to close the opening of the exterior can 10 hermetically.

The cover plate 14 has a degassing hole 16 in a center, and a rubber valve body 18 that closes the degassing hole 16 is disposed on an outer surface of the cover plate 14. Further, a cylindrical positive electrode terminal 20 with flange is fixed onto the outer surface of the cover plate 14 to cover the valve body 18, and the positive electrode terminal 20 presses the valve body 18 to the cover plate 14. Note that a vent hole not illustrated is provided in the positive electrode terminal 20. Accordingly, during a normal time, the degassing hole 16 is hermetically closed by the valve body 18.

When gas is generated in the exterior can 10, and an internal pressure thereof is increased, the valve body 18 is compressed by the internal pressure to open the degassing hole 16, and the gas is released from an inside of the exterior can 10 via the degassing hole 16 and the vent hole of the positive electrode terminal 20. In other words, the degassing hole 16, the valve body 18 and the positive electrode terminal 20 form a safety valve for the battery.

In the exterior can 10, an electrode assembly 22 is accommodated. The electrode assembly 22 includes a positive electrode 24, a negative electrode 26 and a separator 28 that are respectively band-shaped, and is wound spirally in a state in which the separator 28 is sandwiched between the positive electrode 24 and the negative electrode 26. In other words, the positive electrode 24 and the negative electrode 26 are overlaid on each other via the separator 28.

In the exterior can 10, a positive electrode lead 30 is disposed between one end of the electrode assembly 22 and the cover plate 14, and respective end portions of the positive electrode lead 30 are respectively connected to the positive electrode 24 and the cover plate 14. In other words, the positive electrode terminal 20 of the cover plate 14 and the positive electrode 24 are electrically connected to each other via the positive electrode lead 30 and the cover plate 14. Note that a circular insulation member 32 is disposed between the cover plate 14 and the electrode assembly 22, and the positive electrode lead 30 extends through a slit provided in the insulation member 32. A circular insulation member 34 is also disposed between the electrode assembly 22 and a bottom portion of the exterior can 10.

A predetermined amount of alkaline electrolyte (not illustrated) is injected into the exterior can 10. The alkaline electrolyte is impregnated into the positive electrode 24, the negative electrode 26 and the separator 28, and promotes charge/discharge reaction between the positive electrode 24 and the negative electrode 26. Note that a kind of the alkaline electrolyte is not particularly limited, but a sodium hydroxide aqueous solution, a lithium hydroxide aqueous solution, a potassium hydroxide aqueous solution, or an aqueous solution in which two or more of these solutions are mixed and the like may be cited as examples. Further, a density of the alkaline electrolyte is not particularly limited, and, for example, an alkaline electrolyte of 8N (specified value) can be used.

Figure 2:
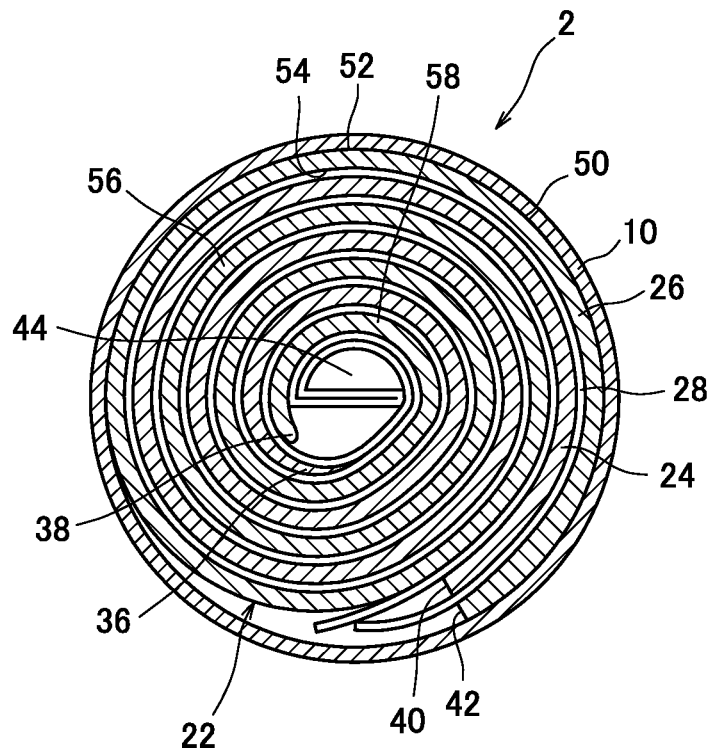
FIG. 2 is a cross-sectional view of the alkaline secondary battery shown in FIG. 1.

Referring to FIG. 2, in the electrode assembly 22, the positive electrode 24 and the negative electrode 26 are alternately overlaid in a radial direction of the electrode assembly 22 with the separator 28 being sandwiched therebetween.

In detail, the electrode assembly 22 is formed as follows. The positive electrode 24, the negative electrode 26 and the separator 28 that are respectively band-shaped are overlapped and then spirally wounded by using a winding core from one end side of these electrodes via the separator 28. Therefore, one ends (winding start ends) 36 and 38 of the positive electrode 24 and the negative electrode 26 are positioned on a center side of the electrode assembly 22. And the other end (winding end) 40 of the positive electrode 24 and the other end (winding end) 42 of the negative electrode 26 are positioned on an outer circumferential side of the electrode assembly 22. In a first circumference portion (innermost circumference portion) 58 that is spirally wound at an angle of approximately 360° from the winding start end 36, one surface of the negative electrode 26, that is, only an outer circumferential surface side faces the positive electrode 24 via the separator 28, and the other surface of the negative electrode 26, that is, an inner circumferential surface side does not face the positive electrode 24.

On an outer circumference of the electrode assembly 22, the separator 28 is not wound, and an outermost circumference portion 50 of the negative electrode 26 forms the outer circumference of the electrode assembly 22. In other words, a surface (outer surface) 52 on an outside in a radial direction of the electrode assembly in the outermost circumference portion 50 of the negative electrode 26 is in an exposed state without being covered with the separator 28, and the outer surface 52 and a circumferential wall of the exterior can contact each other, whereby the negative electrode 26 and the exterior can 10 are electrically connected to each other. Further, a surface (inner surface) 54 on an inside in the radial direction of the electrode assembly in the outermost circumference portion 50 of the negative electrode 26 faces the positive electrode 24 via the separator 28. In other words, only the inner surface 54 of the outermost circumference portion 50 of the negative electrode 26 faces the positive electrode 24.

Further, in the negative electrode 26, an intermediate portion 56 continues on inside from the outermost circumference portion 50, and the first circumference portion 58 continues in a vicinity of a winding center of the electrode assembly 22 more inward of the intermediate portion 56.

The intermediate portion 56 is a portion in which both surfaces of the outer surface 52 and the inner surface 54 of the negative electrode 26 face the positive electrode 24 via the separator 28, is spirally wound, and extends to a vicinity of the winding center of the electrode assembly 22. The first circumference portion 58 is positioned in the center portion of the electrode assembly 22, and the outer surface 52 thereof faces the positive electrode 24 via the separator 28.

In this way, the negative electrode 26 that is spirally wound is constituted of the first circumference portion 58, the intermediate portion 56, and the outermost circumference portion 50 from the winding center. The first circumference portion 58 has only the outer surface 52 facing the positive electrode 24. The intermediate portion 56 extends from the first circumference portion 58, and is located on the outside in the radial direction of the first circumference portion 58 with both the outer surface 52 and the inner surface 54 facing the positive electrode 24. The outermost circumference portion 50 extends from the intermediate portion 56, and is located on the outside in the radial direction from the intermediate portion 56 with only the inner surface 54 facing the positive electrode 24.

Note that the winding core is extracted after winding, and therefore, a space 44 corresponding to a shape of the winding core exists in the center portion of the electrode assembly 22.

As a material of the separator 28, for example, a polyamide fiber nonwoven fabric, and a polyolefin fiber nonwoven fabric of polyethylene or polypropylene to which hydrophilic functional groups are imparted can be used.

The positive electrode 24 is constituted of a conductive positive electrode substrate having a porous structure, and a positive electrode mixture held in vacancy of the positive electrode substrate. As the positive electrode substrate, for example, a net-shaped, a sponge-shaped or fibrous metal body to which nickel plating is applied can be used.

The positive electrode mixture includes positive electrode active material particles, a conductive agent, and a binder. This binder serves to bind the positive electrode active material particles and the conductive agent to each other, and bind the positive electrode mixture to the positive electrode substrate. The positive electrode active material particles are nickel hydroxide particles or higher nickel hydroxide particles. Note that the nickel hydroxide particles may be in a form of a solid solution including cobalt, zinc, cadmium and the like. The positive electrode mixture configures a positive electrode mixture layer when held in the vacancy of the positive electrode substrate.

As the conductive agent, one or more kinds selected from cobalt compounds such as cobalt oxide (CoO) and cobalt hydroxide ($Co(OH)_2$), and cobalt (Co) can be used, for example. The conductive agent is added to the positive electrode mixture as necessary, and as an added form, the conductive agent may be included in the positive electrode mixture in a form of coating that covers a surface of the positive electrode active material as well as the powder form.

Figure 3:
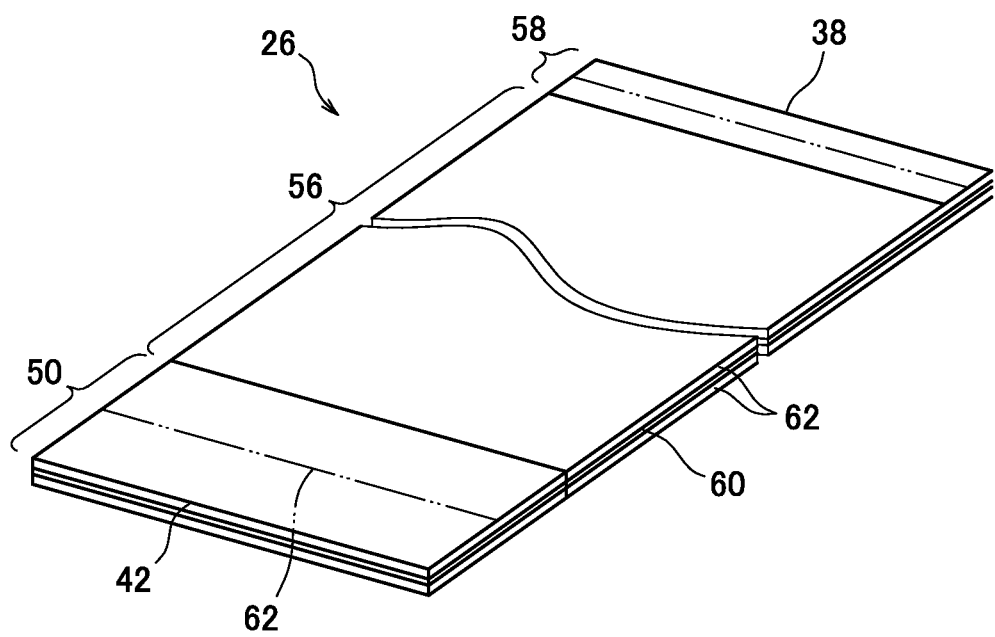
FIG. 3 is a development showing a negative electrode used in the alkaline secondary battery shown in FIG. 1.

As shown in FIG. 3, the negative electrode 26 has a conductive negative electrode core 60 forming a belt-shape, and a negative electrode mixture 62 is supported on the negative electrode core 60. The negative electrode core 60 is formed of a sheet-shaped metal material in which through-holes are distributed, and, for example, a punching metal sheet, or a sintered substrate made by molding and sintering metal powder can be used. Note that the negative electrode core 60 is one example of the core. The negative electrode mixture configures a negative electrode mixture layer when held by the negative electrode core. The negative electrode mixture layer is one example of the electrode mixture layer.

The negative electrode mixture 62 includes hydrogen absorbing alloy particles that can absorb and release hydrogen as a negative electrode active material, a conductive agent, and a binder. Here, as the binder, a hydrophilic or hydrophobic polymer or the like can be used. As the conductive agent, graphite, carbon black, Ketjen black or the like can be used. The negative electrode mixture 62 is not only filled in the through-hole of the negative electrode core 60, but also held in layer shapes on both surfaces of the negative electrode core 60 respectively.

The hydrogen absorbing alloy in the hydrogen absorbing alloy particles is not particularly limited, and an ordinary hydrogen absorbing alloy is used.

EXAMPLES

1. Battery Production

Example 1

(1) Production of Positive Electrode 24

Nickel hydroxide powder including 2.5% by mass of zinc and 1.0% by mass of cobalt was put into a cobalt sulfate aqueous solution. While stirring the cobalt sulfate aqueous solution, 1 mol/l of sodium hydroxide aqueous solution was gradually added dropwise to react, and during the reaction, a precipitate was formed while maintaining pH at 11. Next, the formed precipitate was filtered off, washed with water, and vacuum dried to obtain nickel hydroxide powder with a surface coated with 5% by mass of cobalt hydroxide.

The obtained nickel hydroxide powder coated with cobalt hydroxide was put into 25% by mass sodium hydroxide aqueous solution. At this time, a mass ratio satisfied P:Q=1: 10, wherein P represents a mass of the nickel hydroxide powder coated with cobalt hydroxide, and Q represents a mass of the sodium hydroxide aqueous solution. The sodium hydroxide aqueous solution to which the nickel hydroxide powder was added was heat-treated while the sodium hydroxide aqueous solution was stirred for eight hours with the temperature kept at 85° C.

Thereafter, the heat-treated nickel hydroxide powder was washed with water, was dried at 65° C., and nickel positive electrode active material powder in which a surface of the nickel hydroxide particles is coated with a higher cobalt oxide was obtained.

To 95 parts by mass of the obtained nickel positive electrode active material powder, 3 parts by mass of zinc oxide powder, 2 parts by mass of cobalt hydroxide, and 50 parts by mass of aqueous solution including 0.2% by mass of hydroxypropyl cellulose powder as the binder were added and kneaded to prepare a positive electrode mixture slurry. The active material slurry is filled in expanded nickel as the positive electrode substrate, was rolled after being dried, and was cut in a predetermined size to obtain a nickel positive electrode board.

(2) Production of Negative Electrode 26

After respective metal materials of La, Sm, Mg, Ni and Al were mixed so as to have a predetermined molar ratio, the mixed metal materials were put into an induction melting furnace to melt the mixed metal materials, and then cooled to prepare an ingot.

To this ingot, heat treatment of heating in an argon gas atmosphere at a temperature of 1000° C. for 10 hours was applied to homogenize the ingot, and then the ingot was mechanically pulverized in an argon gas atmosphere to obtain a rare earth-Mg—Ni hydrogen absorbing alloy power. For the obtained rare earth-Mg—Ni hydrogen absorbing alloy powder, a particle distribution was measured by a laser diffraction/scattering type particle size distribution measuring device (device name: SRA-150 made by MICRO TRAC CO, LTD.). As a result, the average particle size, which corresponds to 50% of accumulation by mass basis, was 35 μm.

When a composition of the hydrogen absorbing alloy powder was analyzed by an inductively coupled plasma spectroscopy (ICP), the composition was $La_{0.30}Sm_{0.70}Mg_{0.10}Ni_{3.30}Al_{0.2}$. Further, when X-ray diffraction measurement (XRD measurement) was performed for the hydrogen absorbing alloy powder, the crystal structure was $Ce_2Ni_7$ type.

To 100 parts by mass of the obtained hydrogen absorbing alloy powder, 0.5 parts by mass of Ketjen black powder, 1.0 parts by mass of styrene butadiene rubber powder, 0.25 parts by mass of sodium polyacrylate powder, 0.05 parts by mass of carboxymethyl cellulose powder, and 20 parts by mass of water were added, and kneaded under an environment at 25° C. to prepare negative electrode mixture paste.

The negative electrode mixture paste was applied onto both surfaces of a punching metal sheet as the negative electrode core to produce a negative electrode mixture layer. A coating mass of the electrode mixture was 180 mg/cm$^2$ in the first circumference portion 58, was 174 mg/cm$^2$ in the intermediate portion 56, and was 105 mg/cm$^2$ in the outermost circumference portion 50. An amount of the hydrogen absorbing alloy in terms of alloy at this time was 177 mg/cm$^2$ in the first circumference portion 58, was 171 mg/cm$^2$ in the intermediate portion 56, and was 103 mg/cm$^2$ in the outermost circumference portion 50. After the paste was dried, the negative electrode core to which hydrogen absorbing alloy powder adheres was further rolled to increase the amount of alloy per volume, and was cut in a predetermined size to produce the plate-shaped negative electrode mixture sheet.

(3) Assembly of Nickel Metal Hydride Secondary Battery

The positive electrode 24 and the negative electrode 26 that were produced in the above described steps were caused to face each other via the separator and were spirally wound up to be accommodated in the exterior can 10. A predetermined amount of 8N electrolyte in which KOH, NaOH, and LiOH were mixed in a weight ratio of 11:2.6:1.0 was poured. And an opening of the exterior can 10 was sealed with the cover plate 14. Accordingly, a cylindrical nickel metal hydroxide secondary battery (battery A) with a nominal capacity of 1500 mAh was produced.

Example 2

The positive electrode 24 was produced in the same way as in Example 1. The negative electrode 26 was produced with the coating mass of the negative electrode mixture set as 193 mg/cm$^2$ in the first circumference portion 58, 173 mg/cm$^2$ in the intermediate portion 56, and 105 mg/cm$^2$ in the outermost circumference portion 50. The amount of the hydrogen absorbing alloy in terms of alloy at this time was 189 mg/cm$^2$ in the first circumference portion 58, 170 mg/cm$^2$ in the intermediate portion 56, and 103 mg/cm$^2$ in the outermost circumference portion 50. The nickel metal hydroxide secondary battery (battery B) similar to the battery of Example 1 except that the coating masses of the negative electrode mixture were changed from those of Example 1 was produced.

Example 3

The positive electrode 24 was produced similarly to Example 1. The negative electrode 26 was produced with the coating mass of the negative electrode mixture set as 220 mg/cm$^2$ in the first circumference portion 58, 169 mg/cm$^2$ in the intermediate portion 56, and 105 mg/cm$^2$ in the outermost circumference portion 50. The amount of the hydrogen absorbing alloy in terms of alloy at this time was 216 mg/cm$^2$ in the first circumference portion 58, 166 mg/cm$^2$ in the intermediate portion 56, and 103 mg/cm$^2$ in the outermost circumference portion 50. The nickel metal hydride secondary battery (battery C) similar to the battery of Example 1 except that the coating masses of the negative electrode mixture were changed from those of Example 1 was produced.

Comparative Example 1

The positive electrode 24 was produced similarly to Example 1. The negative electrode 26 was produced with the coating masses of the negative electrode mixture set as 175 mg/cm$^2$ in the first circumference portion 58, 175 mg/cm$^2$ in the intermediate portion 56, and 105 mg/cm$^2$ in the outermost circumference portion 50. The amount of the hydrogen absorbing alloy in terms of alloy at this time was 172 mg/cm$^2$ in the first circumference portion 58 and the intermediate portion 56, and 103 mg/cm$^2$ in the outermost circumference portion 50. The nickel metal hydride secondary battery (battery D) similar to the battery of Example 1 except that the coating masses of the negative electrode mixture were changed from those of Example 1 was produced.

Comparative Example 2

The positive electrode 24 was produced similarly to Example 1. The negative electrode 26 was produced with the coating masses of the negative mixture set as 230 mg/cm$^2$ in the first circumference portion 58, 168 mg/cm$^2$ in the intermediate portion 56, and 105 mg/cm$^2$ in the outermost circumference portion 50. The amount of the hydrogen absorbing alloy in terms of alloy at this time was 226 mg/cm$^2$ in the first circumference portion 58, 165 mg/cm$^2$ in the intermediate portion 56, and 103 mg/cm$^2$ in the outermost circumference portion 50. The nickel metal hydride secondary battery (battery E) similar to the battery of Example 1 except that the coating masses of the negative electrode mixture were changed from those of Example 1 was produced.

2. Evaluation of Nickel Metal Hydride Secondary Battery (1) Initial Activation Processing Initial activation processing was performed for each battery by performing five charge/discharge cycles with each cycle including operations of performing charging for 16 hours with a charging current of 0.4 A (0.1 C), and discharging with a discharge current of 0.8 A (0.2 C) until the battery voltage reaches 1.0 V to each of the batteries A to E.

(2) Battery Internal Pressure Characteristics

To each of the batteries A to E, a pressure sensor was attached to a bottom of the exterior can 10, charging was performed with a charging current of 1.5 A at an environmental temperature of 25° C., and the battery internal pressure of each of the batteries A to E was measured. FIG. 4 shows a relationship among the negative electrode mixture amounts in the respective first circumference portions 58, the intermediate portions 56 and the outermost circumference portions 50 of the negative electrodes 26, the amounts of hydrogen absorbing alloy, the ratio of amounts of alloy of the first circumference portions 58 and the outermost circumference portions 50 to the intermediate portions 56, the battery internal pressure, and yields during battery production of the respective batteries. FIG. 5 shows a relationship between the amount of hydrogen absorbing alloy in the first circumference portion 58 and the battery internal pressure.

As is seen from FIGS. 4 and 5, the battery internal pressures are respectively 0.69 MPa, 0.58 MPa, and 0.50 MPa in the batteries A, B and C of Examples 1, 2 and 3, and was 0.99 MPa in the battery D of Comparative Example 1. Comparing the batteries A to C of Examples 1 to 3, and the battery D of Comparative Example 1, it is determined that the battery internal pressure is reduced by increasing the coating mass of the mixture of the first circumference portion 58 of the spiral negative electrode 26. In the nickel metal hydride battery, oxygen gas is generated as gas from the positive electrode 24 at an end of charging, and the oxygen gas reacts with hydrogen on the surface of the negative electrode 26 to be water and consumed. In the electrode assembly 22, the space 44 where the center portion is hollow is present in the state where the electrode assembly 22 is spirally wound and accommodated in the exterior can 10. The gas generated inside of the battery 2 accumulates in the space 44, and therefore, in the first circumference portion 58 of the negative electrode 26 close to the space 44, a gas consumption reaction tends to occur.

Consequently, it is possible to increase the amount of hydrogen that reacts with the oxygen gas by increasing the amount of hydrogen absorbing alloy in the first circumference portion 58 of the negative electrode 26, a reaction speed of the gas consumption reaction becomes high. It is conceivable that as a result of the above, the oxygen amount inside the exterior can 10 is reduced, and the battery internal pressure can be reduced.

On the other hand, an amount of the oxygen gas in the vicinity of the outermost circumference portion 50 of the negative electrode 26 is smaller as compared with that of the oxygen gas accumulating in the space 44, so that even when the amount of the alloy applied per unit area of the outermost circumference portion 50 is smaller as compared with that of the intermediate portion 56, an influence of the amount of alloy on a rise in the battery internal pressure is small.

Specifically, in the battery A of Example 1, the amount of alloy in the first circumference portion 58 is increased by 3% as compared with the battery D of Comparative Example 1, but the battery internal pressure is reduced by approximately 30%. As is seen from the measurement values of the battery B of Example 2, and the battery C of Example 3, when the amount of hydrogen absorbing alloy in the first circumference portion 58 is further increased, the battery internal pressure is gradually reduced.

However, as is seen from the battery E of Comparative Example 2, when the mixture amount of the first circumference portion 58 is increased beyond a predetermined amount, the yield of battery production decreases although the battery internal pressure is not high as compared with the battery D of Comparative Example 1. This is because the size of the exterior can 10 in which the electrode assembly 22 is accommodated is fixed, so that short circuit failures increase when the mixture amount of the first circumference portion 58 to the intermediate portion 56 exceeds 30 parts by mass.

In this way, according to the present disclosure, by increasing the coating mass on the first circumference portion 58, of the negative electrode mixture that is applied onto the negative electrode 26, it is possible to produce the nickel metal hydride secondary battery that prevents a rise in battery internal pressure and has high safety.

According to the electrode for alkaline secondary battery of the present disclosure, the reactant of the first circumference portion consumes the gas that is generated from the gas generating electrode to be accumulated in a surplus space in the battery. Therefore, a rise in battery internal pressure is suppressed.

Embodiments of the present invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. An electrode for an alkaline secondary battery, the electrode being included in an electrode assembly accommodated in a container of the alkaline secondary battery, comprising:
   a band-shaped core; and
   an electrode mixture layer supported by the core, wherein the electrode faces a gas generating electrode with a separator being sandwiched therebetween, the gas generating electrode generating gas during an ending portion of a charging period in which the alkaline secondary battery is charged, the electrode and the gas generating electrode being wound with the separator to form a spiral shape;
   wherein the electrode comprises:
      a first circumference portion corresponding to a single first innermost winding at a starting portion of the spiral shape of the electrode and having an outer surface only which faces the gas generating electrode,
      an intermediate circumference portion corresponding to a second and following windings of the spiral shape of the electrode except for a single last outermost winding of the electrode, the intermediate portion including an inner surface and an outer surface both of which face the gas generating electrode, and
      an outermost circumference portion corresponding to the single last outermost winding at an ending portion of the spiral shape of the electrode, the outermost circumference portion having an inner surface only which faces the gas generating electrode,
   wherein the electrode mixture layer includes hydrogen that develops a reaction consuming oxygen generated at the ending portion of the charging period, and the electrode mixture layer includes a hydrogen absorbing alloy that can absorb and/or release the hydrogen;
   wherein an amount of the hydrogen absorbing alloy per corresponding unit area of the supporting band-shaped core in the first circumference portion is more than an amount of the hydrogen absorbing alloy per corresponding unit area of the supporting band-shaped core in the intermediate circumference portion and more than an amount of the hydrogen absorbing alloy per corresponding unit area of the supporting band-shaped core in the outermost circumference portion; and
   wherein a ratio of the amount of the hydrogen absorbing alloy per unit area of the band-shaped core in the first circumference portion to the amount of the hydrogen absorbing alloy per unit area of the band-shaped core in the intermediate circumference portion is 112% to 130%.

2. The electrode according to claim 1, wherein the amount of the hydrogen absorbing alloy per unit area of the supporting band-shaped core in the outermost circumference portion is less than the amount of the hydrogen absorbing alloy in the intermediate circumference portion.

3. An alkaline secondary battery comprising:
   a container; and
   an electrode assembly accommodated in the container with an alkaline electrolyte, wherein the electrode assembly has a spiral shape in which a positive electrode and a negative electrode are wound in a state in which the positive electrode and the negative electrode are overlaid on each other via a separator,
   wherein the negative electrode is the electrode according to claim 1, and the positive electrode is the gas generating electrode.

* * * * *